Jan. 1, 1924
A. B. McKINLEY ET AL
1,479,247
DUMP WAGON
Filed March 5, 1923
2 Sheets-Sheet 1
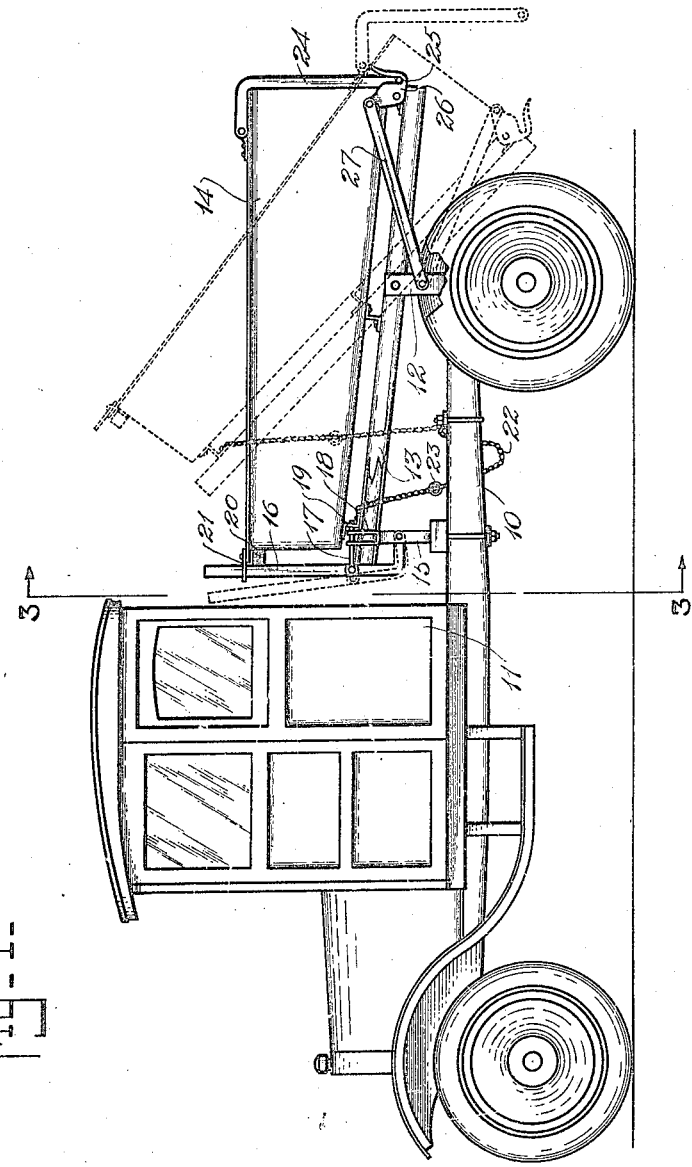
Inventor
Andrew B. McKinley
Albert Hurley
By 
Attorney

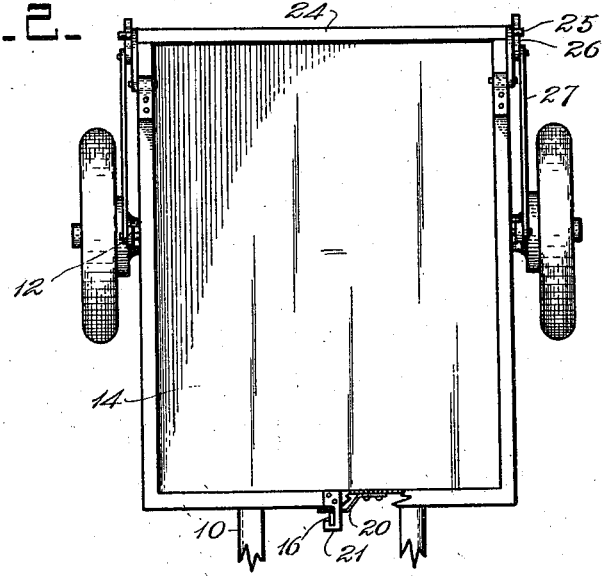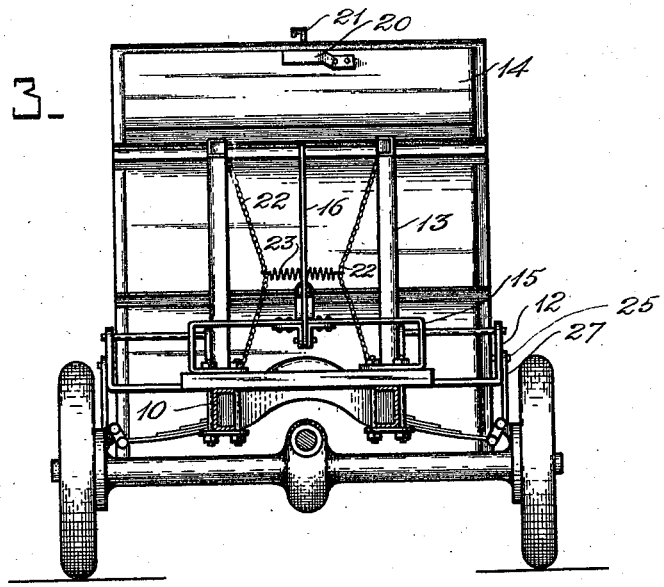

Patented Jan. 1, 1924.

1,479,247

UNITED STATES PATENT OFFICE.

ANDREW B. McKINLEY AND ALBERT HURLEY, OF LOUISVILLE, KENTUCKY, ASSIGNORS TO CONTINENTAL CAR CO. OF AMERICA, OF LOUISVILLE, KENTUCKY, A CORPORATION OF KENTUCKY.

DUMP WAGON.

Application filed March 5, 1923. Serial No. 622,896.

*To all whom it may concern:*

Be it known that we, ANDREW B. MC-KINLEY and ALBERT HURLEY, citizens of the United States, both residing at Louisville, in the county of Jefferson and State of Kentucky, have invented certain new and useful Improvements in Dump Wagons, of which the following is a specification.

This invention relates to vehicles, and has special reference to a dump cart.

One important object of the invention is to provide an improved arrangement of self dumping cart wherein the vehicle will be provided with a dumping body normally locked against dumping movement but which, upon release of the lock, automatically dumps.

A second important object of the invention is to provide an improved tail-gate arrangement for such a dumping cart, the tailgate being automatically released upon movement of the cart to dumping position.

A third important object of the invention is the provision of novel means for preventing accidental dumping of said cart.

A fourth important object of the invention is to provide a novel arrangement of shock absorber and limit device for limiting the dumping movement of the body and preventing too great shock from such dumping movement.

With the above and other objects in view as will be hereinafter apparent, the invention consists in general of novel details of construction and combinations of parts hereinafter fully described, illustrated in the accompanying drawings and specifically claimed.

In the accompanying drawings like characters of reference indicate like parts in the several views, and:

Fig. 1 is a side elevation of a motor vehicle provided with the improved dumping body, the body being shown in loading carrying position in full lines, and in dumping position in dotted lines.

Fig. 2 is a plan view of the rear end of the vehicle showing the dumping body, a portion of the body being broken away to disclose the means for preventing accidental dumping.

Fig. 3 is a section on the line 3—3 of Fig. 1, and disclosing the body in dumping position.

In the embodiment of the invention herein illustrated, there is shown an ordinary automobile truck having a chassis 10 and a cab 11. Extending from the rear end of the chassis is a pair of brackets 12 whereon is mounted a body carrying frame 13 supporting a body 14 having a rearwardly and downwardly inclined bottom, the pivoted point being so arranged that when the body is loaded, there will be a greater weight to the rear of the pivoted points than to the front thereof. Fixed to the chassis 10 is a frame 15, whereto is pivoted one end of a locking lever 16 having a handle extending up adjacent the rear of the cab. This lever carries a locking pin 17 which extends rearwardly from the lever and passes through the guide member 18 on the frame, the rear end of the pin extending in locking position through an opening in the front cross frame member 19 of the body supporting frame.

Fixed to the front of the body is a leaf spring 20, and on the top of the front upper edge of said body is a hook 21. When the lever is in locking position and the body in loaded position, the lever is engaged in the hook 21, the spring 20 securely holding it in such engaged position, but when it is desired to release the lever it is simply moved rearwardly until it can be moved out of the hook, and then laterally whereupon it may be moved forwardly to pull the pin out of the opening in the cross frame member 19. It being remembered that the body is loaded heavier at the rear, it will be seen that as soon as this pin is pulled out, the rear end of the body will tilt downward, and the front end upward. In order to limit this tilting movement, there is provided a pair of side chains 22, each of which has one end connected to the chassis 10, and its other end connected to the body carrying frame 13.

Connecting the chains 22 intermediate their ends is a coil spring 23, the length of which is less than the distance between the point of connection of the chains with the respective sides of the chassis 10, so that as the vehicle is dumped, the central parts of the chains are drawn toward each other by the spring 23 and, while these chains naturally tend to assume straight lines between their respective points of connection with the chassis and the dump body frame, the spring 23 resists this tendency, and thus acts as a shock absorber. At 24 is an end gate which is pivoted to the top rear portion of the body 14, and is provided at its lower end with projecting pins 25 engaged, when the dump body is loaded, by hooks 26, each of which is connected by a link 27 with a respective standard 12, the hooks and links being so arranged that tilting of the rear end of the body downward will throw the hooks into releasing position and permit the pins 25 to pass out of the hooks and the tail-gate 24 to open.

Thus it will be seen that upon releasing the dump body by proper movement of the lever 16, the body will swing from full to dotted line position, as shown in Fig. 1, and at the same time, the hooks 26 will be tilted, and the tail-gate released so that it also may assume the dotted line position shown in that figure. As the body moves to this position, the spring will absorb the shock, and prevent undue strains being brought on the chains and other parts.

There has thus been provided a simple and efficient device of the kind described and for the purpose specified.

It is obvious that minor changes may be made in the form and construction of the invention without departing from the material spirit thereof. It is not, therefore, desired to confine the invention to the exact form herein shown and described, but it is desired to include all such as properly come within the scope claimed.

Having thus described the invention, what is claimed as new, is:

1. In a device of the kind described, a vehicle chassis, a dump body pivoted intermediate its ends thereto and arranged to have its rear swing downward and its front end swing upward to dumping position, and combined shock absorbing and movement limiting means connecting the front end of the dump body with the vehicle chassis and comprising a pair of chains each having one end connected to the chassis and the other to the dump body and tending to straighten upon movement of the dump body to dumping position, and means to resist the straightening of said chains yieldably.

2. In a device of the kind described, a vehicle chassis, a dump body pivoted intermediate its ends thereto and arranged to have its rear end swing downward and its front end swing upward to dumping position, a pair of chains each connecting one side of the chassis with one side of the dump body adjacent the front thereof, and a tension spring connecting said chains intermediate their ends and arranged to resist strain of the chains between their points of connection with the chassis and the dump body.

In testimony whereof we affix our signatures.

ANDREW B. McKINLEY.
ALBERT HURLEY.